US009887400B2

(12) United States Patent
Park

(10) Patent No.: US 9,887,400 B2
(45) Date of Patent: Feb. 6, 2018

(54) SECONDARY BATTERY

(75) Inventor: Joung Hwan Park, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1825 days.

(21) Appl. No.: 12/418,725

(22) Filed: Apr. 6, 2009

(65) Prior Publication Data
US 2009/0311593 A1 Dec. 17, 2009

(30) Foreign Application Priority Data
Jun. 16, 2008 (KR) .................. 10-2008-0056378

(51) Int. Cl.
H01M 2/02 (2006.01)
H01M 2/10 (2006.01)
(Continued)

(52) U.S. Cl.
CPC ....... *H01M 2/1077* (2013.01); *H01M 2/0207* (2013.01); *H01M 2/0482* (2013.01);
(Continued)

(58) Field of Classification Search
CPC .............................. H01M 2/361; H01M 2/365
(Continued)

(56) References Cited

U.S. PATENT DOCUMENTS 5,879,416 A * 3/1999 Nakamura ............. B23K 26/28
219/121.64

2003/0059677 A1 * 3/2003 Shinohara ........... H01M 2/0232
429/174
(Continued)

FOREIGN PATENT DOCUMENTS

JP 13-229898 A 8/2001
JP 2001229898 A * 8/2001 .............. H01M 2/08
(Continued)

OTHER PUBLICATIONS

KR-10-2005-0034750. English Translation. Aug. 28, 2011. Fifteen pages.*
(Continued)

*Primary Examiner* — Bobby Ramdhanie
*Assistant Examiner* — Denise R Anderson
(74) *Attorney, Agent, or Firm* — Knobbe Martens Olson & Bear LLP

(57) ABSTRACT

A secondary battery is disclosed. In one embodiment, the secondary battery includes i) an electrode assembly comprising upper and lower surfaces opposing each other, ii) a container configured to receive the electrode assembly via an opening defined at one end thereof, iii) a cap assembly configured to close the opening of the container, wherein an electrolyte injection hole is defined in the cap assembly, and wherein the electrolyte injection hole is configured to receive electrolyte and iv) an insulation case configured to be received by the container and being interposed between the cap assembly and the electrode assembly, wherein a first electrolyte permeation passage is formed between an outer surface of the insulation case and an inner surface of the container, and wherein the first electrolyte permeation passage is configured to expedite the permeation of the received electrolyte into the lower surface of the electrode assembly.

21 Claims, 8 Drawing Sheets

(51) Int. Cl.
 *H01M 10/052* (2010.01)
 *H01M 2/06* (2006.01)
 *H01M 2/04* (2006.01)

(52) U.S. Cl.
 CPC .......... *H01M 2/06* (2013.01); *H01M 10/052* (2013.01); *H01M 2/1094* (2013.01)

(58) Field of Classification Search
 USPC ........................................................ 429/163
 See application file for complete search history.

(56) References Cited

U.S. PATENT DOCUMENTS

| 2004/0234846 | A1* | 11/2004 | Han et al. ...................... 429/163 |
| 2005/0136323 | A1* | 6/2005 | Sugimune et al. ........... 429/174 |
| 2006/0246349 | A1* | 11/2006 | Uh ....................... H01M 10/052 429/175 |
| 2006/0263679 | A1 | 11/2006 | Park et al. |
| 2007/0151590 | A1* | 7/2007 | Kang ........................... 136/201 |
| 2008/0274402 | A1* | 11/2008 | Uh ............................... 429/174 |

FOREIGN PATENT DOCUMENTS

| JP | 2005-149728 | A | 6/2005 |
| JP | 2007-073203 | | 3/2007 |
| JP | 2007-73203 | A | 3/2007 |
| KR | 10-0624957 | B1 | 9/2006 |
| KR | 10-2006-0111845 | A | 10/2006 |
| KR | 2006-0111845 | | 10/2006 |
| KR | 10-2007-0054845 | A | 5/2007 |
| KR | 2007-0054845 | | 5/2007 |

OTHER PUBLICATIONS

JP2001-229898. Namihana et al. English Translation. 7 pages.*
KR100816218. Publication Date: Mar. 24, 2008. 15 pages.*
KR10-2004-0037578. Do et al. English Translation. May 7, 2004. 12 pages.*
Korean Notice of Allowance dated Jan. 21, 2011 for Korean Patent Publication No. KR 10-2010-0043516 which corresponds to the captioned application.

* cited by examiner

SECONDARY BATTERY

RELATED APPLICATIONS

This application is based on and claims priority to Korean Patent Application No. 10-2008-0056378 filed on Jun. 16, 2008 in the Korean Intellectual Property Office (KIPO), the entire contents of which are hereby incorporated by reference.

BACKGROUND OF THE INVENTION

Field of the Invention

The present invention relates to a secondary battery, and more particularly, to a secondary battery that can increase the electrolyte permeation speed of an electrode assembly by effectively injecting the electrolyte through the outside of the electrode assembly.

Description of the Related Technology

A lithium secondary battery can be repeatedly charged and thus has been widely used in portable electronic devices such as a cellular phone, a PDA, a navigation device and a notebook computer.

Usually, the lithium secondary battery is manufactured by sealing an electrode assembly functioning as a power source with an outer case such as a pouch or can and then injecting electrolyte into the outer case.

SUMMARY OF CERTAIN INVENTIVE ASPECTS

One aspect of the present invention is a secondary battery that can increase the electrolyte permeation speed of an electrode assembly by effectively injecting the electrolyte through the outside of the electrode assembly.

Another aspect of the present invention is a secondary battery, which includes: an electrode assembly; a can having an opening formed at one end thereof to receive the electrode assembly; a cap assembly sealing the opening of the can; and an insulation case, received in the can, being interposed between the cap assembly and the electrode assembly, where a separating space is formed between an outer surface of the insulation case and an inner surface of the can.

The insulation case may further include a spacing projection projected from the outer surface thereof and the separating space may be formed by contact between the spacing projection and the inner surface of the can.

In addition, the spacing projection may be formed in plural number at the insulation case. The spacing projection may form a constant distance between the outer surface of the insulation case and the inner surface of the can.

The plurality of spacing projections may be formed on at least four corners of the outer surface of the insulation case so as to allow the insulation case to be fitted in the can. A length of the spacing projection may be 10 to 70% of an average thickness of the insulation case.

A contact portion of the spacing projection contacted to the can may be projected within a region corresponding to 5 to 60% of a circumference length of the insulation case. An electrolyte passing region may be formed outside the insulation case.

The insulation case may include: a seating plate seated on an upper surface of the insulation case; and a side wall, formed integrally with the seating plate, being projected upward from a wide surface of the seating plate.

The spacing projection may be projected from at least one of sides of the seating plate or side wall. The side wall may have a shape formed by connecting a plurality of tubes to each other.

Another aspect of the invention is a secondary battery, comprising: i) an electrode assembly, ii) a can configured to receive the electrode assembly via an opening defined at one end thereof, iii) a cap assembly configured to seal the opening of the can and iv) an insulation case configured to be received in the can and being interposed between the cap assembly and the electrode assembly, wherein a separating space is formed between an outer surface of the insulation case and an inner surface of the can.

In the above secondary battery, the insulation case may further comprise a projection extending from the outer surface thereof, and wherein the separating space is defined by i) the projection, ii) the outer surface of the insulation case and iii) the inner surface of the can.

In the above secondary battery, the projection may comprise a plurality of sub-projections formed at the insulation case. In the above secondary battery, the lengths of the plurality of sub-projections may be substantially the same as each other. In the above secondary battery, the plurality of sub-projections may be formed on at least four corners of the outer surface of the insulation case so as to allow the insulation case to be fitted in the can.

In the above secondary battery, the length of the projection may be about 10% to about 70% of an average thickness of the insulation case. In the above secondary battery, the projection may be positioned within a region corresponding to about 5% to about 60% of a circumference length of the insulation case. In the above secondary battery, an electrolyte passing region may be formed outside the insulation case.

In the above secondary battery, the insulation case may comprise: a seating plate seated on an upper surface of the insulation case and a side wall formed integrally with the seating plate and extending substantially perpendicularly from the seating plate toward the cap assembly.

In the above secondary battery, the insulation case may comprise a projection extending from i) at least one of sides of the seating plate or ii) the side wall. In the above secondary battery, the side wall may comprise a plurality of tubes connected to each w other and arranged along the outer surface of the insulating case.

Another aspect of the invention is a secondary battery, comprising: an electrode assembly comprising upper and lower surfaces opposing each other; a container configured to receive the electrode assembly via an opening defined at one end thereof; a cap assembly configured to close the opening of the container, wherein an electrolyte injection hole is defined in the cap assembly, and wherein the electrolyte injection hole is configured to receive electrolyte; and an insulation case configured to be received by the container and being interposed between the cap assembly and the electrode assembly, wherein a first electrolyte permeation passage is formed between an outer surface of the insulation case and an inner surface of the container, and wherein the first electrolyte permeation passage is configured to expedite the permeation of the received electrolyte into the lower surface of the electrode assembly.

In the above secondary battery, the insulation case may further comprise at least one projection which extends from the outer surface thereof and contacts the inner surface of the container, and wherein the first electrolyte permeation passage is defined by i) the at least one projection, ii) the inner surface of the container and iii) the outer surface of the insulation case.

In the above secondary battery, a cross-section of the at least one projection may be one of the following: rectangular, triangular, semicircular and trapezoidal. In the above secondary battery, a second electrolyte permeation passage may be formed in the insulation case, and wherein the second electrolyte permeation passage may be configured to expedite the permeation of the received electrolyte into the upper surface of the electrode assembly.

In the above secondary battery, the insulation case may comprise: a seating plate seated on an upper surface of the insulation case; and a side wall formed integrally with the seating plate and extending substantially perpendicularly from the seating plate toward the cap assembly. In the above secondary battery, the side wall comprises a plurality of tubes connected to each other and arranged along the outer surface of the insulating case.

Still another aspect of the invention is a secondary battery, comprising: an electrode assembly comprising upper and lower surfaces opposing each other; a container configured to receive the electrode assembly via an opening defined at one end thereof; a cap assembly configured to close the opening of the container, wherein an electrolyte injection hole may be defined in the cap assembly, and wherein the an electrolyte injection hole may be configured to receive electrolyte; an insulation case configured to be received by the container and being interposed between the cap assembly and the electrode assembly; and means for expediting the permeation of the received electrolyte into at least one of the upper and lower surfaces of the electrode assembly.

In the above secondary battery, the insulation case may further comprise at least one projection which extends from the outer surface thereof and contacts the inner surface of the container, wherein the expediting means may comprise first expediting means for expediting the permeation of the received electrolyte into the lower surface of the electrode assembly, and wherein the first expediting means may be defined by i) the at least one projection, ii) the inner surface of the container and iii) the outer surface of the insulation case.

In the above secondary battery, the expediting means may comprise second expediting means for expediting the permeation of the received electrolyte into the upper surface of the electrode assembly, and the second expediting means are formed in the insulation case.

DETAILED DESCRIPTION OF EXEMPLARY EMBODIMENTS

Figure 1A:
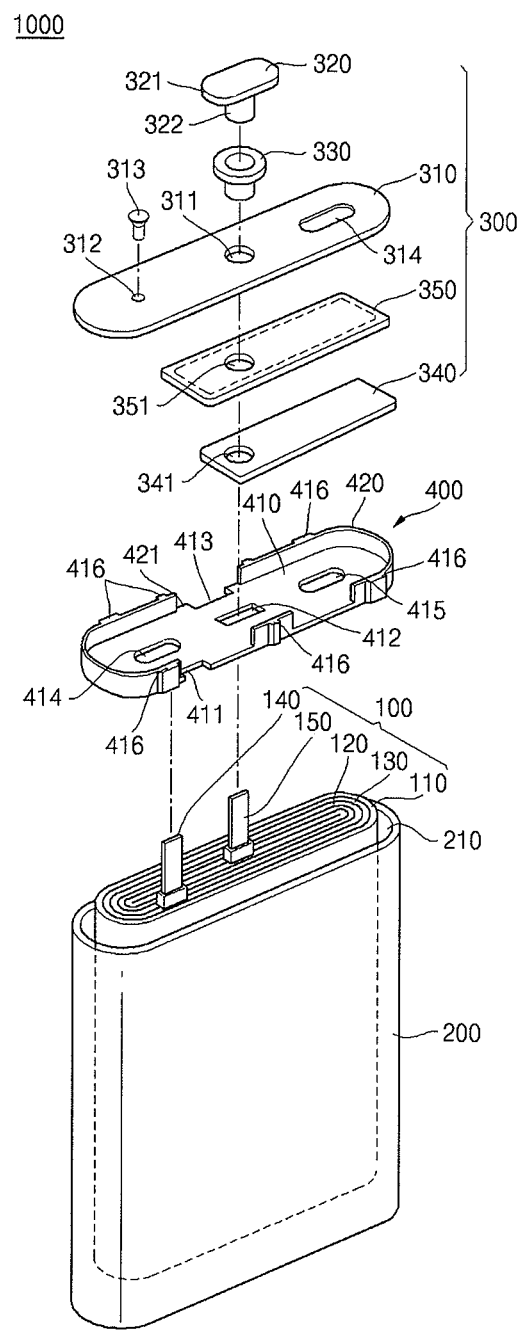
FIG. 1A is an exploded perspective view illustrating a secondary battery according to one exemplary embodiment of the present invention.

Generally, in the lithium secondary battery using a can as the outer case, an electrolyte injection hole is formed at the outer case and then the electrolyte is injected through the electrolyte injection hole. Usually only one electrolyte injection hole is formed to reduce sealing processes and improve sealing property of the battery.

Further, in the secondary battery, the electrolyte permeates from one surface of the electrode assembly near the electrolyte injection hole because the electrolyte is injected through one electrolyte injection hole. Accordingly, the opposite surface corresponding to the one surface of the electrode assembly is lately permeated with the electrolyte. Therefore, the time for the electrolyte to permeate in the electrode assembly increases. As a result, the manufacturing time for the secondary battery increases.

In addition, an insulation case is inserted to insulate an upper surface of the electrode assembly. However, the insulation case prevents the electrolyte from permeating a lower surface of the electrode assembly, thereby reducing the permeation speed of the electrolyte in the electrode assembly.

Hereinafter, embodiments of the present invention will be described in detail with reference to the accompanying drawings. It is appreciated that the present invention is not limited to the embodiments disclosed hereinafter, but can be implemented in diverse forms. The matters defined in the description, such as the detailed structure and elements, are nothing but specific details provided to assist those of ordinary skill in the art in K a comprehensive understanding of the invention, and the present invention is only defined within the scope of the appended claims. In the entire description of the present invention, the same drawing reference numerals are used for the same elements across various figures.

Figure 1B:
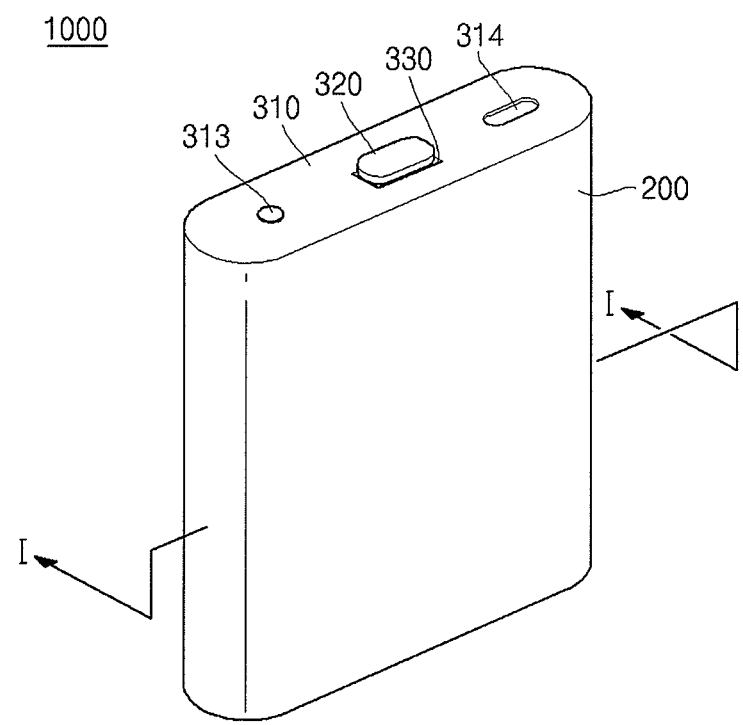
FIG. 1B is a perspective view illustrating a combined state of the secondary battery of FIG. 1A.
Figure 1C:
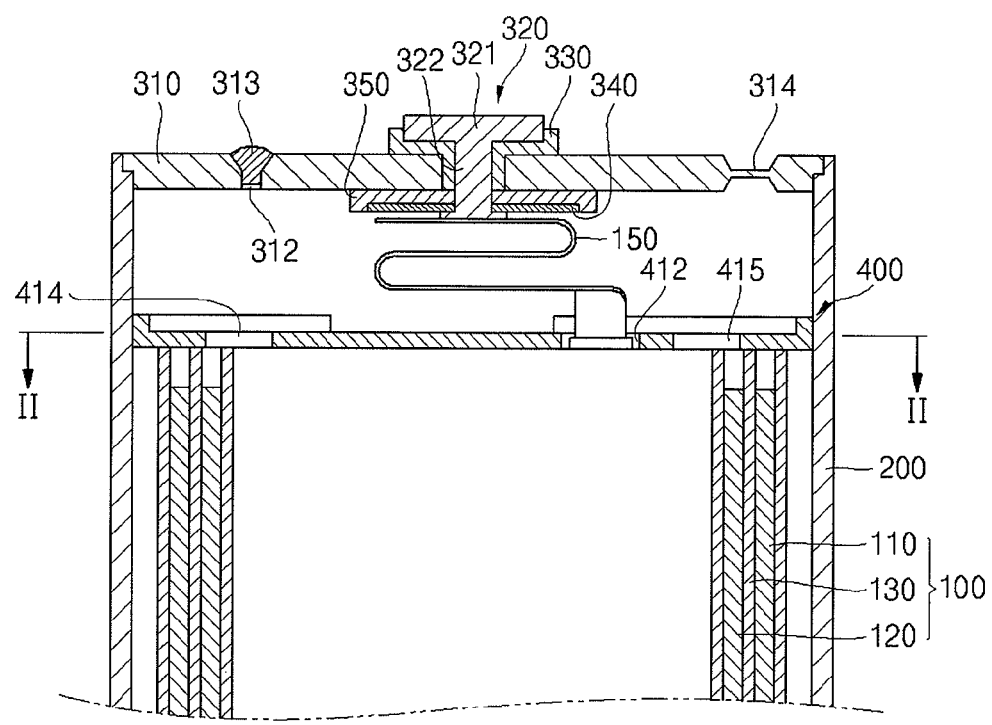
FIG. 1C is a partial sectional view taken along 'I-I' line of FIG. 1B.
Figure 1D:
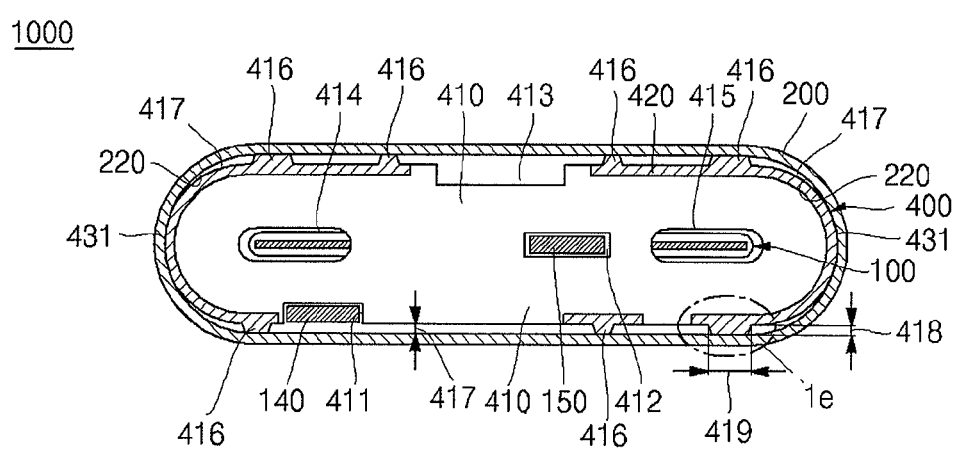
FIG. 1D is a partial sectional view taken along 'II-II' line of FIG. 1C.
Figure 1E:
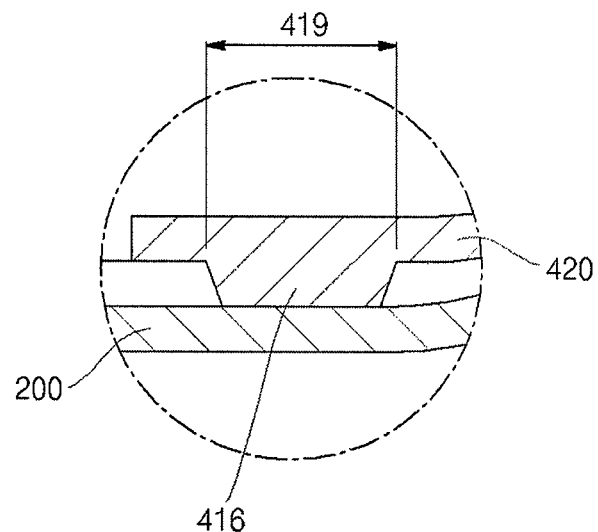
FIG. 1E is a magnified partial sectional view illustrating '1e' region of FIG. 1D.
Figure 1F:
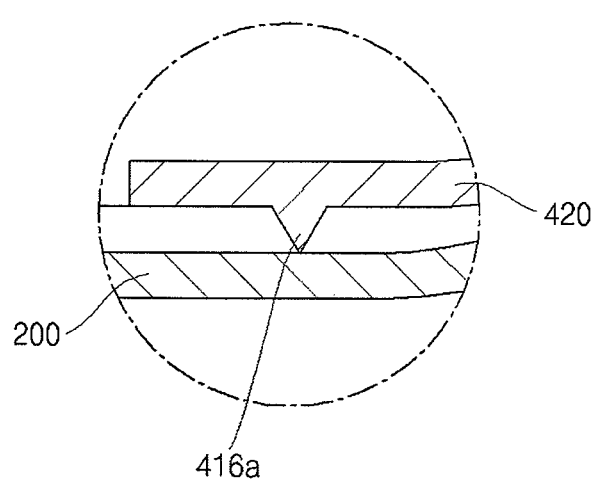
FIG. 1F is a partial sectional view illustrating a modification example of a spacing projection of FIG. 1E.
Figure 1G:
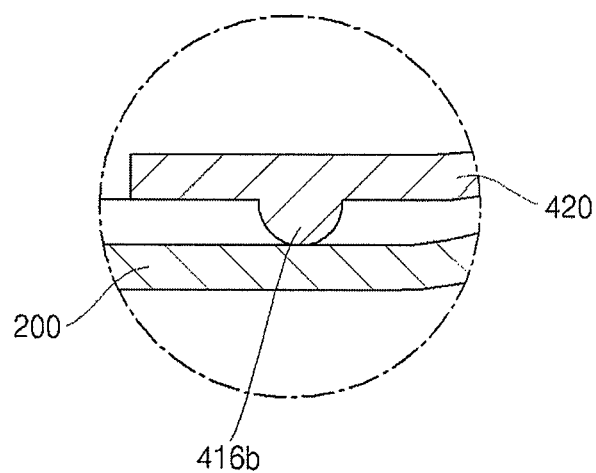
FIG. 1G is a partial sectional view illustrating a modification example of a spacing projection of FIG. 1E.

FIG. 1A is an exploded perspective view illustrating a secondary battery according to one exemplary embodiment of the present invention and FIG. 1B is a perspective view illustrating a combined state of the secondary battery of FIG. 1A. FIG. 1C is a partial sectional view taken along 'I-I' line of FIG. 1B and FIG. 1D is a partial sectional view taken along 'II-II' line of FIG. 1C. FIG. 1E is a magnified partial sectional view illustrating '1e' region of FIG. 1D and FIG. 1F is a partial sectional view illustrating a modification example of a spacing projection of FIG. 1E. FIG. 1G is a partial sectional view illustrating a modification example of a spacing projection of FIG. 1E.

Referring to FIGS. 1A to 1D, a secondary battery 1000 according to one exemplary embodiment includes an electrode assembly 100, a can 200, a cap assembly 300 and an insulation case 400.

The electrode assembly 100 includes a cathode plate 110, an anode plate 120, a separator 130, a cathode tab 140 and an anode tab 150.

The cathode plate 110 may include a cathode collector and a cathode active material layer. The cathode collector may be formed of a conductive metal film such as aluminum. The cathode active material layer may include a layered compound containing lithium, a conductive material improving conductivity and a binder improving bonding force between the layered compound and conductive material. The cathode active material layer E may be coated on a wide surface of the cathode collector and combined thereto.

The anode plate 120 may include an anode collector and an anode active material layer. The anode collector may be formed of a conductive metal film such as copper. The anode active material layer may include carbon material such as graphite and a binder improving bonding force of carbon particles. The anode active material layer may be coated on a wide surface of the anode collector and combined thereto.

The separator 130 is interposed between the cathode plate 110 and the anode plate 120 to insulate them from each other. In addition, the separator 130 includes a F plurality of pores through which lithium ions can move between the anode and cathode plates. The separator 130 may be made of polymer resin such as polyethylene (PE) or polypropylene (PP), but not limited thereto.

The cathode tab 140 may be combined to the cathode collector of the cathode plate 110 by welding such as ultrasonic welding or resistance welding. In addition, the cathode tab 140 is electrically coupled to the cap plate 310 and can 200. The cathode tab 140 may be made of conductive metal such as nickel, copper and aluminum.

The anode tab 150 may be combined to the anode collector of the anode plate 120 by welding such as ultrasonic welding or resistance welding. In addition, the anode tab 150 is electrically coupled to an electrode terminal 320. The anode tab 150 may be made of conductive metal such as nickel, copper and aluminum.

The electrode assembly 100 may be formed by interposing the separator 130 between the cathode and anode plates 110 and 120 and winding them together in a jelly-roll type. In one embodiment, the jelly-roll type electrode assembly 100 is formed in a flat rectangular electrode assembly 100 by pressing an outer surface thereof.

The can 200 receives the electrode assembly 100 through an opening formed at one end thereof. The can 200 may be made of conductive metal such as aluminum.

The cap assembly 300 includes a cap plate 310, an electrode terminal 320 and an insulation gasket 330. The cap assembly 300 further includes a terminal plate 340 and an insulation plate 350.

The cap plate 310 is combined to an opening 210 of the can 200. In one embodiment, a contact portion between the cap plate 310 and opening 210 of the can 200 may be welded by laser welding, etc. In addition, an electrode terminal hole 311 is formed in the middle of the cap plate 310. In addition, an electrolyte injection hole 312 is formed at the cap plate 310 with being spaced from the electrode terminal hole 311. Electrolyte is injected into the can 200 through the electrolyte injection hole 312. Here, after a stopper 313 is inserted into the electrolyte injection hole 312, the electrolyte injection hole 312 may be sealed by laser welding. In addition, a safety vent 314 is formed at the cap plate 310. The safety vent 314 is formed thinner than an average thickness of the cap plate 310 and prevents explosion of the secondary battery 1000 by being broken when internal pressure of the secondary battery 1000 is increased to a critical pressure. The cap plate 310 may be made of conductive material such as aluminum or aluminum-containing alloy.

The electrode terminal 320 includes a head part 321 seated on an upper part of the electrode terminal hole 311 and a body part 322 that is continued to the head part 321 and inserted into the electrode terminal hole 311. The electrode terminal 320 may be made of conductive material such as nickel or nickel-containing alloy.

The insulation gasket 330 surrounds a lower surface of the head part 321 and the body part of the electrode terminal 320. In addition, the insulation gasket 330 is inserted into the electrode terminal hole 311. Accordingly, the insulation gasket 330 insulates the electrode terminal 320 from the cap plate 310. The insulation gasket 330 may be made of polymer resin.

A coupling hole 341 is formed at the terminal plate 340. The coupling hole 341 is combined to the body part 322 of the electrode terminal 320. In one embodiment, the electrode terminal 320 is pressed so as to have a diameter of the end of the body part 322 larger than a diameter of the coupling hole 341. In addition, the terminal plate 340 is electrically coupled to the anode tab 150. The terminal plate 340 may be made of conductive material such as nickel or nickel-containing alloy.

A body passing hole 351 is formed at the insulation plate 350. The body part 322 of the electrode terminal 320 passes through the body passing hole 351. The insulation plate 350 insulates the cap plate 310 and terminal plate 340 from each other. The insulation plate 350 may be made of polymer resin.

The anode tab 150 can be strongly connected to the electrode terminal 320 by the terminal plate 340 and insulation plate 350. The insulation case 400 includes a seating plate 410, a side wall 420 and a spacing projection 416. The seating plate 410 is seated on the upper surface of the electrode assembly 100.

In addition, a cathode tab passing region 411 is formed at the seating plate 410. In one embodiment, the cathode tab passing region 411 is formed in a shape of groove at a side surface of the seating plate 410. The cathode tab 140 is electrically coupled to the cap plate 310 through the cathode tab passing region 411.

In addition, an anode tab passing region 412 is formed in the seating plate 410. In one embodiment, the anode tab passing region 412 is formed as a hole in the seating plate 410. The anode tab 150 passes through the anode tab passing region 412 and is electrically coupled to the electrode terminal 320.

At least one electrolyte passing region 413 is formed at the circumference of the seating plate 410. In one embodiment, the electrolyte passing region 413 is formed as a groove at the side of the seating plate 410. The electrolyte passing region 413 guides electrolyte to flow into between the electrode assembly 100 and can 200, thereby increasing the permeation speed of the electrolyte in the electrode assembly 100.

In addition, a first electrolyte passing region 414 is formed at the seating plate 410. In one embodiment, the first electrolyte passing region 414 is located in a vertical direction below the electrolyte injection hole 312. Accordingly, when the electrolyte is injected through the electrolyte injection hole 312, the first electrolyte passing region 414 guides the electrolyte to flow toward the center of the electrode assembly 100 and thus the permeation speed is increased in the center part of the electrode assembly 100.

In addition, a second electrolyte passing region 415 is formed at the seating plate 410. The second electrolyte passing region 415 is formed at a position facing the first electrolyte passing region 414 about the middle of the insulation case 400. In other words, the second electrolyte passing region 415 is spaced by a predetermined distance from the first electrolyte passing region 414. When the electrolyte is injected through the electrolyte injection hole 312, the second electrolyte passing region 415 guides the electrolyte to flow toward the center of an upper surface of the electrode assembly 100 and thus the permeation speed is increased in the center part of the electrode assembly 100.

The side wall 420 may be formed integrally with the seating plate 410. In one embodiment, the side wall 420 is projected from an upper part of a wide surface of the seating plate 410 and located at a peripheral edge of the seating plate 410. In addition, a cut part 421 may be formed by cutting a portion of the side wall 420. When the electrolyte is injected through the electrolyte injection hole 312, the cut part 421 guides the electrolyte to flow toward a separating space 417, thereby increasing the permeation speed in the electrode assembly 100.

The insulation case 400 is received inside the can 200. In one embodiment, the insulation case 400 is interposed between the cap assembly 300 and electrode assembly 100.

Referring to FIG. 1D, the separating space 417 is formed between an outer surface of the insulation case 400 and an inner surface of the can 200. The separating space (or an electrolyte permeation passage) 417 provides a path for the electrolyte when the electrolyte is injected through the electrolyte injection hole 312. The separating space 417 guides the electrolyte to flow along the side surface of the electrode assembly 100. On the other hand, when the electrolyte is injected through the electrolyte injection hole 312, the electrolyte flows toward the center of the electrode assembly 100 through first and second electrolyte passing regions 414 and 415. Thus, the electrolyte permeates through both of upper and lower surfaces of the electrode assembly 100, thereby increasing the permeation speed.

In one embodiment, the separating space 417 is formed by a spacing projection 416. The spacing projection 416 is projected from the outer surface of the insulation case 400. The spacing projection 416 contacts the inner surface of the can 200. Or, the spacing projection 416 may be formed at the side of the seating plate 410 of the insulation case 400 or at the side of the side wall 420.

In addition, the spacing projection 416 may be formed in plural number on the outer surface of the insulation case 400. The spacing projection 416 is formed on at least four corners of outer surfaces of the insulation case 400. Accordingly, the insulation case 400 F is fitted in the can 200 and thus movement thereof is prevented. In one embodiment, the separating space 417 formed between the insulation case 400 and can 200 has substantially a constant distance and thus the electrolyte can uniformly flow through the space, thereby increasing the permeation speed in the electrode assembly 100.

In addition, a projected length 418 of the spacing projection 416 may be about 10% to about 70% of an average thickness of the insulation case 400. The projected length 418 of the spacing projection 416 is a length corresponding to the distance between the insulation case 400 and the inner surface of the can 200. The insulation case 400 is an injection molded article whose thickness is formed almost uniform to prevent contraction. The projected length 418 of the spacing projection 416 may be formed thicker than about 10% of an average thickness of thicknesses of the seating plate 410 and side wall 420 to secure the separating space 417. In addition, the projected length 418 of the spacing projection 416 may be formed thinner than about 70% of an average thickness of the insulation case 400.

In addition, a length 419 of the outer surface of the spacing projection 416 contacting the can 200 may be formed within a range of about 5% to about 60% of a circumference length of the insulation case 400. In other words, the length 419 of the spacing projection 416 may be formed longer than about 5% of the circumference length of the insulation case 400 to secure the separating space 417. On the other hand, the length 419 of the spacing projection 416 may be formed shorter than about 60% of the circumference length of the insulation case 400, thereby allowing the insulation case 400 to be easily inserted into the can 200. In other words, the separating space 417 may be formed to have a predetermined distance within about 40% to about 95% of the outer circumference length of the insulation case 400.

As shown in FIG. 1E, the portion of the spacing projection 416 contacting the can 200 may be formed in a rectangular shape. In one embodiment, the spacing projection 416 is strongly fitted in the can 200 by surface-contact. Or, as shown in FIG. 1F, a spacing projection 416a may be formed in a triangle shape. The spacing projection 416a may be line or point-contacted to the can 200 to form wider separating space. Or, as shown in FIG. 1G, the spacing projection 416b may be formed in an arc shape. The spacing projection 416b may make the insulation case 400 to be easily inserted into the can 200 by a bent part thereof.

On the other hand, a bent part 431 is formed at both ends of the insulation case 400. The bent part 431 is formed in a shape corresponding to an inner bent part 220 of the can 200. Here, the separating space 417 is formed between the bent part 431 of the insulation case 400 and the inner bent part 220 of the can 200 and thus the electrolyte can flow through the separating space 417.

As described above, in the secondary battery 1000 according to one embodiment, the electrolyte can flow into the outside of the electrode assembly 100 through L the separating space 417 formed between the insulation case 400 and the inner surface of the can 200. The electrolyte permeates from the outside of the electrode assembly 100 to a lower surface of the electrode assembly 100. In addition, the electrolyte flows to the upper surface the electrode assembly 100 through the first and second electrolyte passing regions 414 and 415. Thus, the electrolyte permeates through both of the upper and lower surfaces of the electrode assembly 100, thereby increasing the permeation speed. Accordingly, the manufacturing time for the secondary battery 1000 is reduced to improve productivity.

In addition, in the secondary battery 1000 according to one embodiment, the electrolyte flows to the outside of the electrode assembly 100 in more amount than the upper surface thereof through the electrolyte passing region 413 and thus the permeation speed is further increased.

Figure 2A:
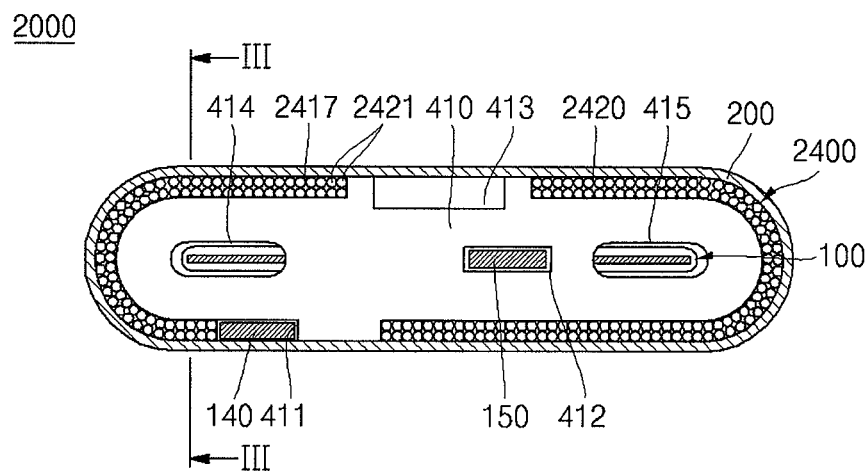
FIG. 2A is a sectional view illustrating a secondary battery according to another exemplary embodiment of the present invention.
Figure 2B:
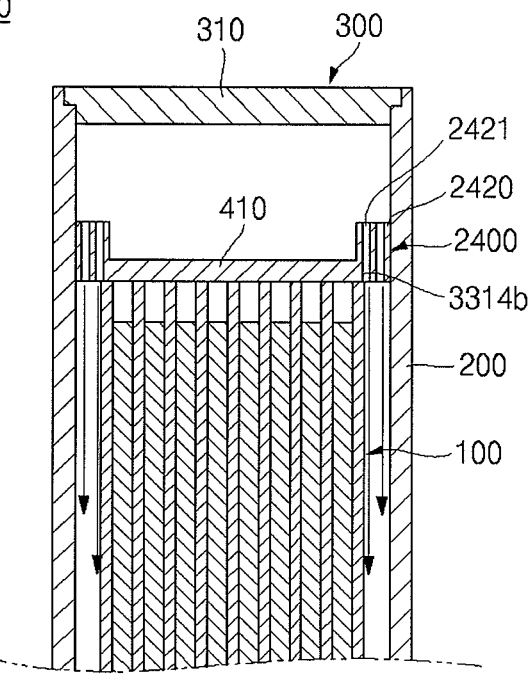
FIG. 2B is a partial sectional view taken along 'III-III' line of FIG. 2A.

FIG. 2A is a sectional view illustrating a secondary battery according to another exemplary embodiment of the present invention and FIG. 2B is a partial sectional view taken along 'III-III' line of FIG. 2A.

Referring to FIGS. 2A and 2B, the secondary battery includes an electrode assembly 100, a can 200, a cap assembly 300 and an insulation case 2400. FIG. 2A corresponds to the sectional view of FIG. 1D except for a different type insulation case. The electrode assembly 100, can 200 and cap assembly 300 of FIGS. 2A and 2B are the same or similar to the above described construction of FIGS. 1A to 1D and thus explanation about them will be omitted.

The insulation case 2400 is formed in a shape similar to the insulation case described above with reference to FIGS. 1A to 1D. Merely, in the insulation case 2400, a side wall 2420 continued to a seating plate 410 is different from the shape shown in FIGS. 1A to 1D.

Referring to FIGS. 2A and 2B, the side wall 2420 is formed by connecting a plurality of tubes 2421 to each other. The plurality of tubes 2421 may be vacant. In this embodiment, when electrolyte is injected through an electrolyte injection hole, the electrolyte flows through a through-hole of the tube 2421 and the electrolyte passing the through-hole flows into between the electrode assembly 100 and can 200. When the electrolyte is injected into the secondary battery 2000, the electrolyte permeates to a lower surface of the electrode assembly 100. Of course, the electrolyte also flows to the upper surface the electrode assembly 100 through the first and second electrolyte passing regions 414 and 415. Thus, the electrolyte permeates through both of the upper and lower surfaces of the electrode assembly 100 simultaneously, thereby increasing the permeation speed.

On the other hand, a separating space 2417 is formed between the insulation case 2400 and can 200. In one embodiment, the separating space 2417 is formed by a bent shape of the side wall 2420 when the bent part of the side wall 2420 formed of the plurality of tubes 2421 contacts the can 200. The electrolyte may also flow through the separating space 2417 when the electrolyte is injected, thereby increasing the permeation speed. Accordingly, the manufacturing time for the secondary battery 2000 is reduced.

Figure 3A:
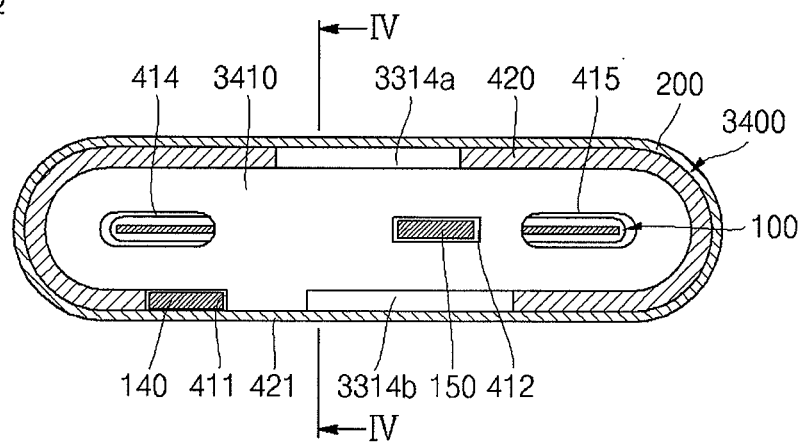
FIG. 3A is a partial sectional view illustrating a secondary battery according to a still another exemplary embodiment of the present invention.
Figure 3B:
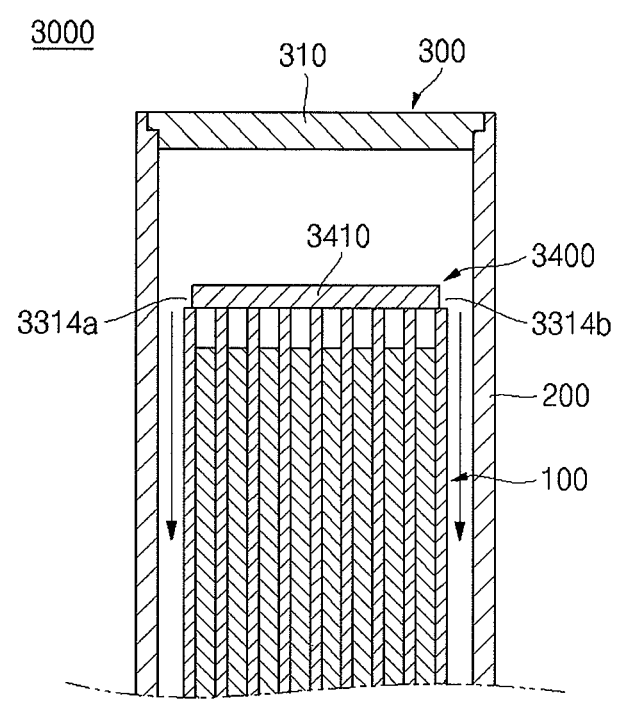
FIG. 3B is a partial sectional view taken along 'IV-IV' line of FIG. 3A.

FIG. 3A is a sectional view illustrating a secondary battery according to a still another exemplary embodiment of the present invention and FIG. 3B is a partial sectional view taken along 'IV-IV' line of FIG. 3A.

Referring to FIGS. 3A and 3B, the secondary battery 3000 includes an electrode assembly 100, a can 200, a cap assembly 300 and an insulation case 3400. FIG. 3A corresponds to the sectional view of FIG. 1D except for a different insulation case. The electrode assembly 100, can 200 and cap assembly 300 of FIGS. 3A and 3B are the same or similar to the above described construction of FIGS. 1A to 1D and thus explanation about them will be omitted.

The insulation case 3400 includes a seating plate 3410 and a side wall 420. Electrolyte passing regions 3314a and 3314b are formed on an outer surface of the seating plate 3410. The side wall 420 may be generally vertically projected from the outer circumference of the seating plate 3410. The side wall 420 has been described above and thus explanation will be omitted.

The electrolyte passing regions 3314a and 3314b include the first and second electrolyte passing regions 3314a and 3314b. The electrolyte passing regions may be formed at both sides of the insulation case 3400 about a length direction of the insulation case 3400. The first and second electrolyte passing regions 3314a and 3314b guide the electrolyte to permeate through the outside of the electrode assembly 100 to the lower surface thereof. Of course, the insulation case 3400 also guides the electrolyte to permeate through the first and second electrolyte passing regions 414 and 415 to the upper surface of the electrode assembly 100.

Accordingly, in the secondary battery 3000 according to at least one embodiment, the electrolyte permeates through both of the upper and lower surfaces of the electrode assembly 100 simultaneously, thereby increasing the permeation speed. Thus, the manufacturing time for the secondary battery 3000 is reduced.

As described above, the secondary battery according to at least one embodiment of the present invention, the permeation speed of the electrolyte in the electrode assembly is increased, thereby reducing the manufacturing time for the secondary battery.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the invention.

What is claimed is:

1. A secondary battery, comprising:
an etectrode assembly;
a can configured to receive the electrode assembly via an opening defined at one end thereof;
a cap assembly configured to seal the opening of the can; and
an insulation case configured to be received in the can and being interposed between the cap assembly and the electrode assembly,
wherein a separating space is formed between an outer surface of the insulation case and an inner surface of the can,
wherein the insulation case comprises:
a seating plate seated on an upper surface of the electrode assembly, wherein the seating plate has a pair of long sides opposing each other and a pair of short sides opposing each other;
a side wall extending from the seating plate toward the cap assembly, wherein the side wall comprises a first side wall surrounding one of the short sides of the seating plate and extending to the long sides, and a second side wall surrounding the other short side of the seating plate and extending to the long sides, wherein the first and second side walls are spaced apart from each other such that the side wall is discontinuously formed, wherein the side wall further comprises a third side wall formed between and spaced apart from the first and second side walls, wherein the third side wall is formed in one of the long sides, and wherein at least a portion of the third side wall faces no side wall in a direction perpendicularly extending from one of the long sides to the other long side; and
a projection extending from the side wall toward an inner surface of the can, wherein the projection comprises at least one first sub-projection extending from the first side wall and at least one second sub-projection extending from the second side wall.

2. The secondary battery of claim 1, wherein the separating space is defined by i) the sub-projections, ii) the outer surface of the insulation case and iii) the inner surface of the can.

3. The secondary battery of claim 1, wherein the height of at least one of the first and second sub-projections is substantially the same as that of at least one of the first and second side walls.

4. The secondary battery of claim 1, wherein the lengths of the sub-projections are substantially the same as each other.

5. The secondary battery of claim 1, wherein the sub-projections are formed on at least four corners of the outer surface of the insulation case so as to allow the insulation case to be fitted in the can.

6. The secondary battery of claim 1, wherein the length of the sub-projections is about 10% to about 70% of an average thickness of the insulation case.

7. The secondary battery of claim 1, wherein the sub-projections are positioned within a region corresponding to about 5% to about 60% of a circumference length of the insulation case.

8. The secondary battery of claim 1, wherein an electrolyte passing region is formed outside the insulation case.

9. The secondary battery of claim 1, further comprising:
an electrolyte injection hole formed in the cap assembly and configured to receive electrolyte;
a first electrolyte opening formed in the seating plate of the insulation case and configured to pass the electrolyte therethrough such that the electrolyte flows toward a first portion of the electrode assembly; and
a second electrolyte opening formed in the seating plate of the insulation case and configured to pass the electrolyte therethrough such that the electrolyte flows toward a second portion of the electrode assembly, wherein the first portion is different in location from the second portion, and wherein the first and second electrolyte openings are separate from each other.

10. The secondary battery of claim 1, further comprising an additional projection formed on the third side wall.

11. A secondary battery, comprising:
an electrode assembly comprising upper and lower surfaces opposing each other;
a container configured to receive the electrode assembly via an opening defined at one end thereof;
a cap assembly configured to close the opening of the container, wherein an electrolyte injection hole is defined in the cap assembly, and wherein the electrolyte injection hole is configured to receive electrolyte; and
an insulation case configured to be received by the container and being interposed between the cap assembly and the electrode assembly,
wherein a first electrolyte permeation passage is formed between an outer surface of the insulation case and an inner surface of the container, and wherein the first electrolyte permeation passage is configured to expedite the permeation of the received electrolyte into the lower surface of the electrode assembly,
wherein the insulation case comprises:
a seating plate seated on an upper surface of the electrode assembly, wherein the seating plate has a pair of long sides opposing each other and a pair of short sides opposing each other;
a side wall extending from the seating plate toward the cap assembly, wherein the side wall comprises a first side wall surrounding one of the short sides of the seating plate and extending to the long sides, and a second side wall surrounding the other short side of the seating plate and extending to the long sides, wherein the first and second side walls are spaced apart from each other such that the side wall is discontinuously formed, wherein the side wall further comprises a third side wall formed between and spaced apart from the first and second side walls, wherein the third side wall is formed in one of the long sides, and wherein at least a portion of the third side wall faces no side wall in a direction perpendicularly extending from one of the long sides to the other long side; and
at least one projection which extends from the side wall toward an inner surface of the container, wherein the projection comprises at least one first sub-projection extending from the first side wall and at least one second sub-projection extending from the second side wall.

12. The secondary battery of claim 11, wherein the first electrolyte permeation passage is defined by i) the sub-projections, ii) the inner surface of the container and iii) the outer surface of the insulation case.

13. The secondary battery of claim 11, wherein a cross-section of the at least one of the sub-projections is one of the following: rectangular, triangular, semicircular and trapezoidal.

14. The secondary battery of claim 11, wherein a second electrolyte permeation passage is formed in the insulation case, and wherein the second electrolyte permeation passage is configured to expedite the permeation of the received electrolyte into the upper surface of the electrode assembly.

15. The secondary battery of claim 11, further comprising:
an electrolyte injection hole formed in the cap assembly and configured to receive electrolyte;
a first electrolyte passing opening formed in the seating plate of the insulation case and configured to pass the electrolyte therethrough such that the electrolyte flows toward a first portion of the electrode assembly; and
a second electrolyte passing opening formed in the seating plate of the insulation case and configured to pass the electrolyte therethrough such that the electrolyte flows toward a second portion of the electrode assembly, wherein the first portion is different in location from the second portion, and wherein the first and second electrolyte openings are separate from each other.

16. The secondary battery of claim 11, wherein the height of at least one of the first and second sub-projections is substantially the same as that of at least one of the first and second side walls.

17. A secondary battery, comprising:
an electrode assembly comprising upper and lower surfaces opposing each other;
a container configured to receive the electrode assembly via an opening defined at one end thereof;
a cap assembly configured to close the opening of the container, wherein an electrolyte injection hole is defined in the cap assembly, and wherein the an electrolyte injection hole is configured to receive electrolyte;
an insulation case configured to be received by the container and being interposed between the cap assembly and the electrode assembly; and
an electrolyte permeation passage configured to expedite the permeation of the received electrolyte into at least one of the upper and lower surfaces of the electrode assembly,
wherein the insulation case comprises:
a seating plate seated on an upper surface of the electrode assembly, wherein the seating plate has a pair of long sides opposing each other and a pair of short sides opposing each other;
a side wall extending from the seating plate toward the cap assembly, wherein the side wall comprises a first side wall surrounding one of the short sides of the seating plate and extending to the long sides, and a second side wall surrounding the other short side of the seating plate and extending to the long sides, wherein the first and second side walls are spaced apart from each other such that the side wall is discontinuously formed, wherein the side wall further comprises a third side wall formed between and spaced apart from the first and second side walls, wherein the third side wall is formed in one of the long sides, and wherein at least a portion of the third side wall faces no side wall in a direction perpendicularly extending from one of the long sides to the other long side; and at least one projection which extends from the side wall and contacts the inner surface of the container, wherein the projection comprises at least one first sub-projection extending from the first side wall and at least one second sub-projection extending from the second side wall.

18. The secondary battery of claim 17, wherein the electrolyte permeation passage comprises a first electrolyte permeation passage configured to expedite the permeation of the received electrolyte into the lower surface of the electrode assembly, and wherein the first electrolyte permeation passage is defined by i) the sub-projections, ii) the inner surface of the container and iii) the outer surface of the insulation case.

19. The secondary battery of claim 17, wherein the electrolyte permeation passage comprises a second electrolyte permeation passage configured to expedite the permeation of the received electrolyte into the upper surface of the electrode assembly, and the second electrolyte permeation passage is formed in the insulation case.

20. The secondary battery of claim 17, further comprising:

an electrolyte injection hole formed in the cap assembly and configured to receive electrolyte;

a first electrolyte passing opening formed in the seating plate of the insulation case and configured to pass the electrolyte therethrough such that the electrolyte flows toward a first portion of the electrode assembly; and a second electrolyte passing opening formed in the seating plate of the insulation case and configured to pass the electrolyte therethrough such that the electrolyte flows toward a second portion of the electrode assembly, wherein the first portion is different in location from the second portion, and wherein the first and second electrolyte openings are separate from each other.

21. The secondary battery of claim 17, wherein the height of at least one of the first and second sub-projections is substantially the same as that of at least one of the first and second side walls.

* * * * *